United States Patent
Sone et al.

(10) Patent No.: US 9,705,629 B2
(45) Date of Patent: Jul. 11, 2017

(54) TRANSMITTING DEVICE AND TRANSMISSION CONTROL METHOD

(71) Applicant: FUJITSU LIMITED, Kawasaki-shi, Kanagawa (JP)

(72) Inventors: Kyosuke Sone, Kawasaki (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/012,175

(22) Filed: Feb. 1, 2016

(65) Prior Publication Data
US 2016/0248537 A1 Aug. 25, 2016

(30) Foreign Application Priority Data
Feb. 20, 2015 (JP) .................................. 2015-031951

(51) Int. Cl.
*H04J 14/02* (2006.01)
(52) U.S. Cl.
CPC ...... *H04J 14/0283* (2013.01); *H04J 14/0204* (2013.01); *H04J 14/0205* (2013.01); *H04J 14/0212* (2013.01)
(58) Field of Classification Search
CPC ............... H04J 14/0283; H04J 14/0204; H04J 14/0205; H04J 14/0212
USPC ........................................................ 398/49
See application file for complete search history.

(56) References Cited

U.S. PATENT DOCUMENTS

| 6,084,694 | A | * | 7/2000 | Milton | H04J 14/0206 398/1 |
| 2001/0040710 | A1 | * | 11/2001 | Sharratt | H04J 14/0227 398/59 |
| 2006/0034610 | A1 | | 2/2006 | Akiyama et al. | |
| 2009/0148166 | A1 | | 6/2009 | Akiyama et al. | |
| 2010/0209106 | A1 | * | 8/2010 | Sugawara | H04B 10/275 398/59 |
| 2011/0038636 | A1 | | 2/2011 | Akiyama et al. | |
| 2011/0076016 | A1 | * | 3/2011 | Wisseman | H04J 14/0204 398/48 |
| 2011/0274425 | A1 | * | 11/2011 | Grobe | H04J 14/0212 398/3 |

FOREIGN PATENT DOCUMENTS

| JP | 2006-87062 | 3/2006 |
| JP | 2010-283446 | 12/2010 |

* cited by examiner

*Primary Examiner* — Dalzid Singh
(74) *Attorney, Agent, or Firm* — Fujitsu Patent Center

(57) ABSTRACT

A transmitting device coupled to a first route and a second route as communication paths on a first ring network and coupled to a third route as a communication path on a second ring network, the transmitting device includes: a first branching unit configured to branch and output signal light input from the first route to a first terminating unit and a second output unit that outputs signal light to the second route; a second branching unit configured to branch and output signal light input from the second route to a second terminating unit, a first output unit that outputs signal light to the first route, and a third output unit that outputs signal light to the third route; and a third branching unit configured to branch and output signal light input from the third route to a third terminating unit that terminates signal light and the second output unit.

5 Claims, 13 Drawing Sheets

TRANSMITTING DEVICE AND TRANSMISSION CONTROL METHOD

CROSS-REFERENCE TO RELATED APPLICATION

This application is based upon and claims the benefit of priority of the prior Japanese Patent Application No. 2015-031951, filed on Feb. 20, 2015, the entire contents of which are incorporated herein by reference.

FIELD

The embodiments disclosed herein are related to a transmitting device and a transmission control method.

BACKGROUND

In recent years, transmitting devices (hereinafter referred to also as nodes) compatible with an optical transmission network (optical transport network (OTN)) or the like have been provided as transmitting devices for carriers. In addition, the technology of a two-way ring network is known, the two-way ring network being formed by coupling a plurality of transmitting devices in the form of a ring in an optical transmission network allowing communication to be performed bidirectionally.

A transmitting device coupled to such a two-way ring network is coupled to a first route and a second route as communication paths on the two-way ring network. For example, the transmitting device branches signal light received from the first route into two pieces of signal light by using a 1×2 optical coupler that branches one piece of signal light into two pieces of signal light. In addition, the transmitting device terminates and outputs one of the branched pieces of signal light, and distributes the other piece of signal light to the second route. Then, by using a 2×1 WSS (wavelength selective switch) that multiplexes two pieces of signal light into one piece of signal light, the transmitting device multiplexes the signal light distributed to the second route and signal light to be transmitted to another transmitting device, and outputs the multiplexed signal light to the second route.

Here, when the optical transmission network is expanded by coupling the two-way ring network and another optical transmission network to each other, a transmitting device serving as a hub for each of the networks (which transmitting device will hereinafter be referred to also as a hub node) distributes signal light received from one of routes to all of the other routes. For example, a hub node coupled to two two-way ring networks is coupled to a first route and a second route as communication paths on one two-way ring network, and is coupled to a third route and a fourth route as communication paths on the other two-way ring network.

Such a hub node branches signal light received from the first route into four pieces of signal light by using a 1×4 optical coupler that branches one piece of signal light into four pieces of signal light. Then, the hub node terminates and outputs one of the branched pieces of signal light, and distributes the three remaining pieces of signal light to the second route, the third route, and the fourth route.

Similarly, the hub node branches each of pieces of signal light received from the second route, the third route, and the fourth route into four pieces of signal light, and terminates one of the branched pieces of signal light and distributes the three remaining pieces of signal light to the routes different from the route from which the signal light is received. Then, by using a 4×1 WSS that multiplexes four pieces of signal light into one piece of signal light, for example, the hub node multiplexes the three pieces of signal light distributed from the second route, the third route, and the fourth route to the first route and signal light to be transmitted to another transmitting device, and outputs the multiplexed signal light to the first route.

However, the above-described technology needs optical couplers and WSSs having a large number of ports because destinations to which signal light is branched are increased as the optical transmission network is expanded. As a result, for example, cost involved in expanding the optical transmission network is increased.

The followings are reference documents.
[Document 1] Japanese Laid-open Patent Publication No. 2006-087062 and
[Document 2] Japanese Laid-open Patent Publication No. 2010-283446.

SUMMARY

According to an aspect of the embodiments, a transmitting device coupled to a first route and a second route as communication paths on a first ring network where communication is performed bidirectionally, and coupled to a third route as a communication path on a second ring network where communication is performed bidirectionally, the transmitting device includes: a first branching unit configured to branch and output signal light input from the first route to a first terminating unit that terminates signal light and a second output unit that outputs signal light to the second route; a second branching unit configured to branch and output signal light input from the second route to a second terminating unit that terminates signal light, a first output unit that outputs signal light to the first route, and a third output unit that outputs signal light to the third route; and a third branching unit configured to branch and output signal light input from the third route to a third terminating unit that terminates signal light and the second output unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a transmitting device and a transmission control method according to the present technology will hereinafter be described in detail with reference to the drawings. Constitutions having the same functions in the embodiments are identified by the same reference symbols, and repeated description thereof will be omitted. It is to be noted that the following embodiments are merely representative of an example, and are not restrictive of embodiments of the transmitting device disclosed in the present application. In addition, the following embodiments may be combined with each other as appropriate within a scope where no inconsistency arises.

First Embodiment

Figure 1:
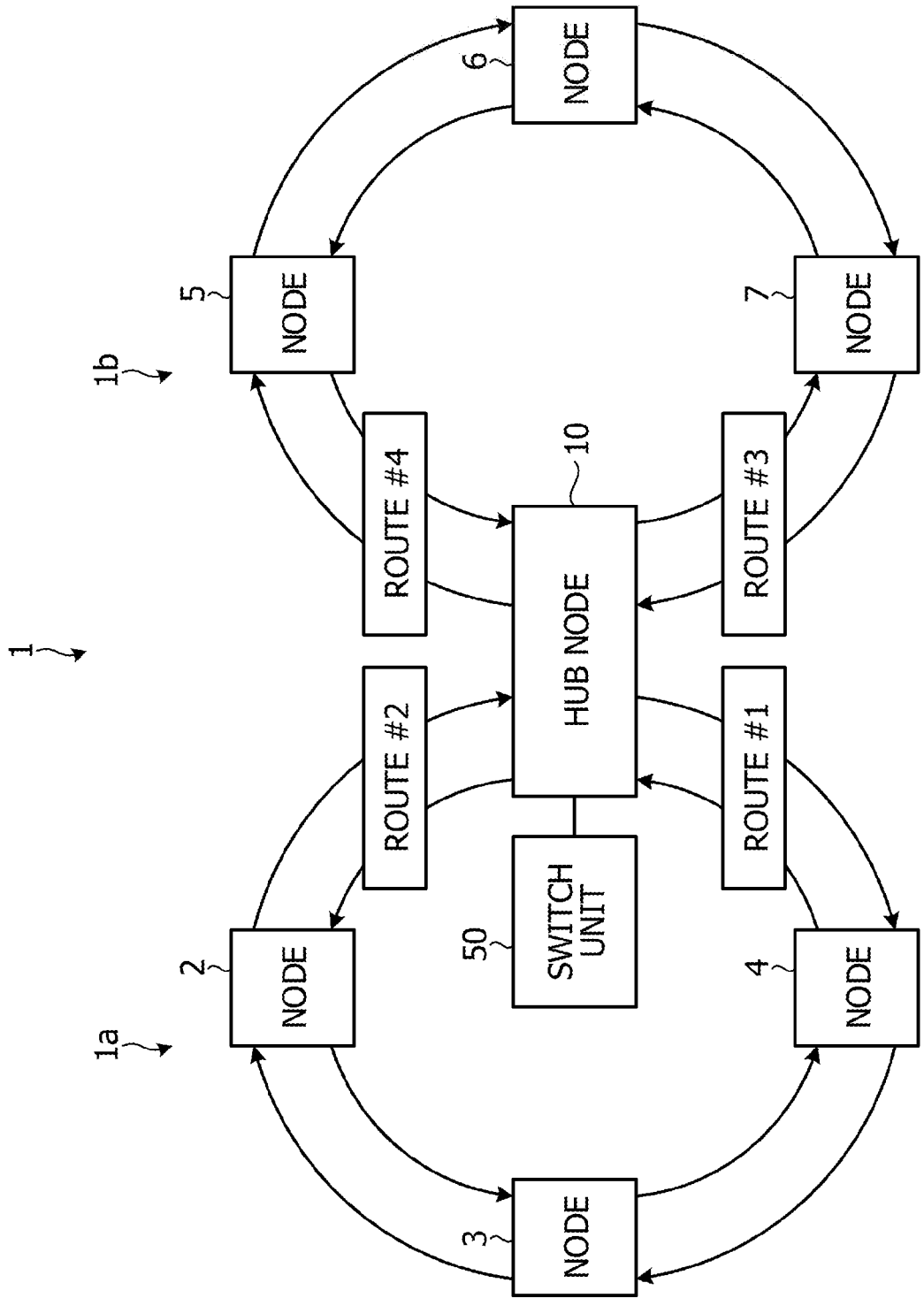
FIG. 1 is a block diagram illustrating an example of an optical transmission network according to a first embodiment.

FIG. 1 is a block diagram illustrating an example of an optical transmission network according to a first embodiment. As illustrated in FIG. 1, an optical transmission network 1 includes a ring network 1a formed by coupling a node 2, a node 3, a node 4, and a hub node 10 in the form of a circular ring. In addition, the optical transmission network 1 includes a ring network 1b formed by coupling a node 5, a node 6, a node 7, and the hub node 10 in the form of a circular ring.

In this case, in the ring network 1a, couplings between the node 2 and the node 3, the node 3 and the node 4, the node 4 and the hub node 10, and the hub node 10 and the node 2 are established by an optical transmission network that allows two-way communication. In addition, in the ring network 1b, couplings between the node 5 and the node 6, the node 6 and the node 7, the node 7 and the hub node 10, and the hub node 10 and the node 5 are established by an optical transmission network that allows two-way communication. Incidentally, the optical transmission networks are realized by communication using wavelength division multiplex (WDM).

Incidentally, in the following description, in the ring network 1a, a two-way communication path coupling the hub node 10 and the node 4 to each other will be described as a route #1, and a two-way communication path coupling the hub node 10 and the node 2 to each other will be described as a route #2. In addition, in the ring network 1b, a two-way communication path coupling the hub node 10 and the node 7 to each other will be described as a route #3, and a two-way communication path coupling the hub node 10 and the node 5 to each other will be described as a route #4.

The nodes 2 to 7 and the hub node 10 transmit and receive wavelength multiplexed signal light, which is obtained by multiplexing a plurality of pieces of signal light of different wavelengths, via the optical transmission networks. For example, the node 2 receives an indication of a wavelength of signal light to be used by the node 2 from a control device not illustrated in the figures. In that case, the node 2 branches wavelength multiplexed signal light received from the node 3 into two pieces of wavelength multiplexed signal light, subjects one of the branched pieces of wavelength multiplexed signal light to wavelength division, and receives signal light of the wavelength indicated from the control device as signal light addressed to the node 2. In addition, the node 2 multiplexes signal light to be transmitted to the other nodes 3 to 7 and the hub node 10 with the other branched piece of wavelength multiplexed signal light, and outputs the multiplexed wavelength multiplexed signal light to the hub node 10.

Similarly, the node 2 branches wavelength multiplexed signal light received from the hub node 10 into two pieces of wavelength multiplexed signal light, subjects one of the pieces of wavelength multiplexed signal light to wavelength division, and obtains signal light addressed to the node 2. In addition, the node 2 multiplexes signal light to be transmitted to the other nodes 3 to 7 and the hub node 10 with the other divided piece of wavelength multiplexed signal light, and outputs the multiplexed wavelength multiplexed signal light to the node 3. In addition, as with the node 2, the other nodes 3 to 7 branch received wavelength multiplexed signal light into two pieces of wavelength multiplexed signal light, obtain signal light addressed to the own devices from one of the pieces of wavelength multiplexed signal light, multiplex signal light to be transmitted with the other piece of wavelength multiplexed signal light, and output the multiplexed signal light.

The hub node 10 is a node serving as a hub for the ring networks 1a and 1b, and is for example a reconfigurable optical add/drop multiplexer (ROADM). For example, the hub node 10 illustrated in FIG. 1 outputs wavelength multiplexed signal light received from the route #1 to the route #2, but does not output the wavelength multiplexed signal light received from the route #1 to any of the route #3 and the route #4. In addition, the hub node 10 transmits wavelength multiplexed signal light received from the route #2 to the route #1 and the route #3, but does not output the wavelength multiplexed signal light received from the route #2 to the route #4. In addition, the hub node 10 transmits wavelength multiplexed signal light received from the route #3 to the route #2 and the route #4, but does not output the wavelength multiplexed signal light received from the route #3 to the route #1. In addition, the hub node 10 outputs wavelength multiplexed signal light received from the route #4 to the route #3, but does not output the wavelength multiplexed signal light received from the route #4 to any of the route #1 and the route #2.

That is, the hub node 10 does not mutually couple each of the routes #1 to #4, but limits an optical transmission path spanning the ring networks 1a and 1b to a path via the route #2 and the route #3. Such a hub node 10 may limit the number of destinations to which wavelength multiplexed signal light is branched, and may therefore mutually couple the ring networks 1a and 1b by optical couplers and WSSs having a small number of nodes. As a result, the hub node 10 may reduce cost at a time of expanding a network.

Incidentally, the ring networks 1a and 1b couple the nodes 2 to 7 and the hub node 10 in an annular form. Therefore, the hub node 10 may realize two-way communication between the nodes 2 to 7 and the hub node 10 when the hub node 10 relays in one of a path via the route #1 and the route #3, a path via the route #1 and the route #4, a path via the route #2 and the route #3, and a path via the route #2 and the route #4.

A switch unit 50 is a relay device that relays communication between a client coupled to the hub node 10 and the hub node 10 via a wired or wireless local area network (LAN). For example, when the switch unit 50 receives an electric signal including data to be transmitted from the client not illustrated in the figures, the switch unit 50 outputs the received electric signal to the hub node 10. In that case, the hub node 10 converts the electric signal into signal light, and transmits the converted signal light to the other nodes 2 to 7. In addition, the hub node 10 converts signal light addressed to the hub node 10 into an electric signal, and outputs the electric signal after the conversion to the switch unit 50. In that case, the switch unit 50 transmits the received electric signal to the client as a transmission destination.

Here, the hub node 10 transmits wavelength multiplexed signal light through the path via the route #2 and the route #3. Therefore, when a fault occurs in the route #2 or the route #3, it is difficult for the nodes 2 to 4 and the nodes 5 to 7 to perform optical communication spanning the ring networks 1a and 1b. Accordingly, the hub node 10 converts wavelength multiplexed signal light received from the route #1 into an electric signal. On the other hand, the switch unit 50 transmits the electric signal of the wavelength multiplexed signal light received from the route #1 to a port that receives an electric signal of data to be transmitted to the route #3. As a result, the hub node 10 may output the wavelength multiplexed signal light received by the hub node 10 from the route #1 to the route #3. Thus, even when a fault has occurred in the route #2, the wavelength multiplexed signal light may be transmitted over the ring networks 1a and 1b.

Figure 2:
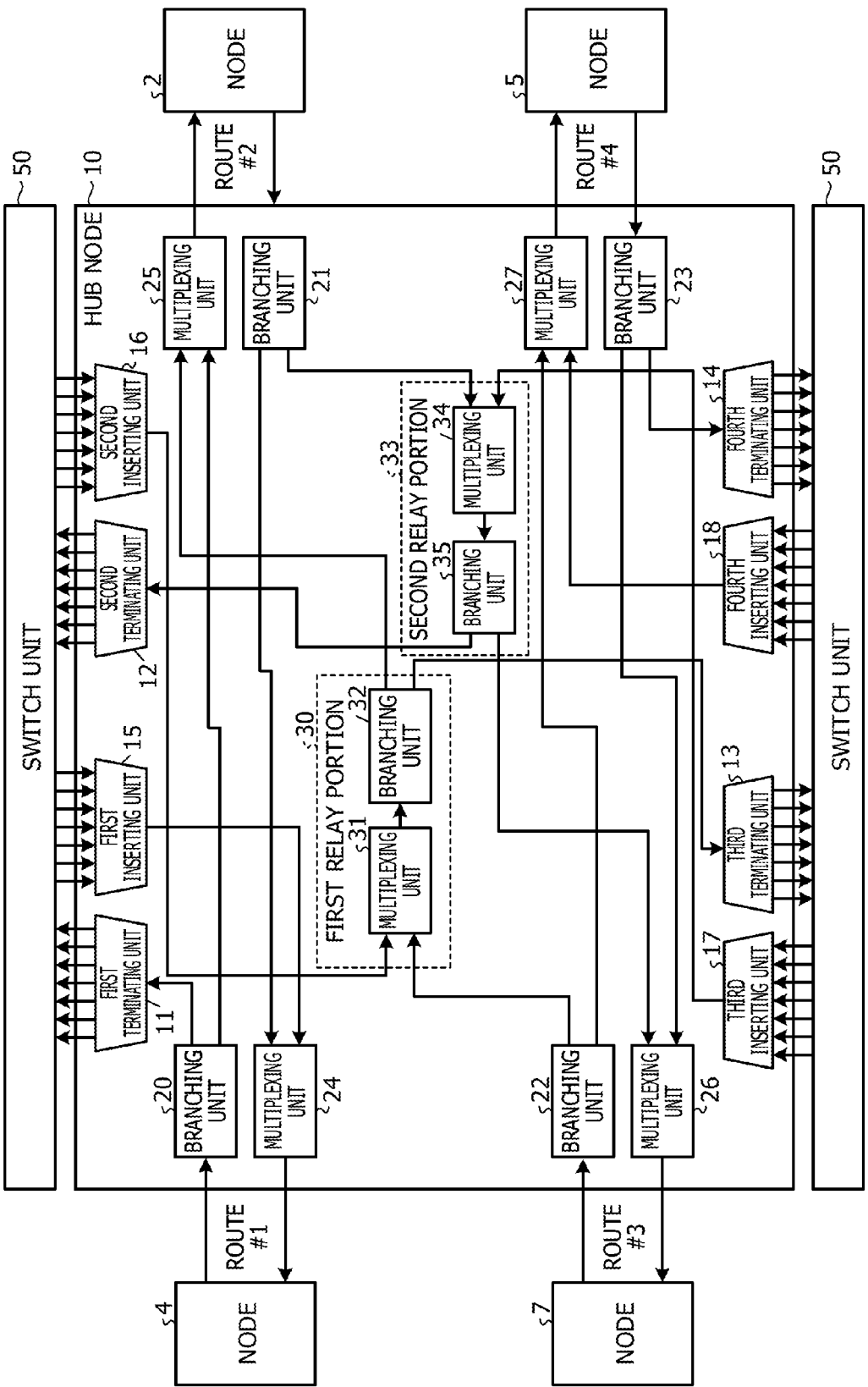
FIG. 2 is a block diagram of assistance in explaining an example of a functional configuration of a hub node.

An example of a hub node will next be described. FIG. 2 is a block diagram of assistance in explaining an example of a functional configuration of a hub node. The hub node illustrated in FIG. 2 may be the hub node 10 illustrated in FIG. 1. The hub node 10 illustrated in FIG. 2 includes a first terminating unit 11, a second terminating unit 12, a third terminating unit 13, a fourth terminating unit 14, a first inserting unit 15, a second inserting unit 16, a third inserting unit 17, and a fourth inserting unit 18. The hub node 10 also includes a plurality of branching units 20 to 23, a plurality of multiplexing units 24 to 27, a first relay portion 30, and a second relay portion 33. In addition, the first relay portion 30 includes a multiplexing unit 31 and a branching unit 32. In addition, the second relay portion 33 includes a multiplexing unit 34 and a branching unit 35.

Incidentally, in the following description, the first terminating unit 11, the second terminating unit 12, the third terminating unit 13, and the fourth terminating unit 14 may be described as terminating units 11 to 14. In addition, in the following description, the first inserting unit 15, the second inserting unit 16, the third inserting unit 17, and the fourth inserting unit 18 may be described as inserting units 15 to 18.

The terminating units 11 to 14 perform processing of terminating wavelength multiplexed signal light input from the branching units 20 to 23. For example, the terminating units 11 to 14 divide input wavelength multiplexed signal light into a plurality of pieces of signal light of different wavelengths, and select signal light of a wavelength to be used for communication by the hub node 10 from the signal light obtained by dividing the wavelength multiplexed signal light into the different wavelengths. Then, the terminating units 11 to 14 convert the selected signal light into electric signals, and output the electric signals after the conversion to the switch unit 50.

Incidentally, wavelength multiplexed signal light received by the hub node 10 from the route #1 is input to the first terminating unit 11. Wavelength multiplexed signal light received by the hub node 10 from the route #2 is input to the second terminating unit 12. In addition, wavelength multiplexed signal light received by the hub node 10 from the route #3 is input to the third terminating unit 13. Wavelength multiplexed signal light received by the hub node 10 from the route #4 is input to the fourth terminating unit 14.

When the inserting units 15 to 18 receive electric signals of data to be newly transmitted to the respective routes #1 to #4 from the switch unit 50, the inserting units 15 to 18 convert the received electric signals into signal light, and output the signal light after the conversion to the multiplexing units 24 to 27. For example, the first inserting unit 15 outputs, to the multiplexing unit 24, the signal light after the conversion as signal light to be output to the route #1. In addition, the second inserting unit 16 outputs, to the multiplexing unit 25, the signal light after the conversion as signal light to be output to the route #2. In addition, the third inserting unit 17 outputs, to the multiplexing unit 26, the signal light after the conversion as signal light to be output to the route #3. In addition, the fourth inserting unit 18 outputs, to the multiplexing unit 27, the signal light after the conversion as signal light to be output to the route #4.

The branching units 20 to 23, 32, and 35 branch one piece of input signal light into two pieces of signal light. The branching units 20 to 23, 32, and 35 are realized by a 1×2 optical coupler including one port on an input side and two ports on an output side, for example. The multiplexing units 24 to 27, 31, and 34 multiplex two pieces of input signal light, and output one piece of signal light. The multiplexing units 24 to 27, 31, and 34 are realized by a 2×1 WSS including two ports on an input side and one port on an output side, for example.

Here, the branching unit 20 branches and outputs wavelength multiplexed signal light received from the route #1 to the first terminating unit 11 and the multiplexing unit 25. In addition, the branching unit 21 branches and outputs wavelength multiplexed signal light received from the route #2 to the multiplexing unit 24 and the multiplexing unit 34 of the second relay portion 33. In addition, the branching unit 22 branches and outputs wavelength multiplexed signal light received from the route #3 to the multiplexing unit 27 and the multiplexing unit 31 of the first relay portion 30. In addition, the branching unit 23 branches and outputs wavelength multiplexed signal light received from the route #4 to the fourth terminating unit 14 and the multiplexing unit 26.

The multiplexing unit 31 multiplexes the signal light input from the second inserting unit 16 and the wavelength multiplexed signal light input from the branching unit 22, and outputs the multiplexed wavelength multiplexed signal light to the branching unit 32. Then, the branching unit 32 branches and outputs the wavelength multiplexed signal light input from the multiplexing unit 31 to the multiplexing unit 25 and the third terminating unit 13.

That is, the multiplexing unit 31 multiplexes the wavelength multiplexed signal light input from the second inserting unit 16 with the wavelength multiplexed signal light output by the branching unit 22 as wavelength multiplexed signal light to be output from the multiplexing unit 25 to the route #2. Then, the branching unit 32 branches and outputs, to the multiplexing unit 25 and the third terminating unit 13, the wavelength multiplexed signal light output by the multiplexing unit 31 as the wavelength multiplexed signal light to be output from the multiplexing unit 25 to the route #2.

The multiplexing unit 34 multiplexes the signal light input from the third inserting unit 17 and the wavelength multiplexed signal light input from the branching unit 21, and outputs the multiplexed wavelength multiplexed signal light to the branching unit 35. Then, the branching unit 35 branches and outputs the wavelength multiplexed signal light input from the multiplexing unit 34 to the multiplexing unit 26 and the second terminating unit 12.

That is, the multiplexing unit 34 multiplexes the wavelength multiplexed signal light input from the third inserting unit 17 with the wavelength multiplexed signal light output by the branching unit 21 as wavelength multiplexed signal light to be output from the multiplexing unit 26 to the route #3. Then, the branching unit 35 branches and outputs, to the multiplexing unit 26 and the second terminating unit 12, the wavelength multiplexed signal light output by the multiplexing unit 34 as the wavelength multiplexed signal light to be output from the multiplexing unit 26 to the route #3.

In addition, the multiplexing unit 24 multiplexes the signal light input from the first inserting unit 15 and the wavelength multiplexed signal light input from the branching unit 21, and outputs the multiplexed wavelength multiplexed signal light from the route #1. In addition, the multiplexing unit 25 multiplexes the wavelength multiplexed signal light input from the branching unit 32 and the wavelength multiplexed signal light input from the branching unit 20, and outputs the multiplexed wavelength multiplexed signal light from the route #2. In addition, the multiplexing unit 26 multiplexes the wavelength multiplexed signal light input from the branching unit 35 and the wavelength multiplexed signal light input from the branching unit 23, and outputs the multiplexed wavelength multiplexed signal light from the route #3. In addition, the multiplexing unit 27 multiplexes the signal light input from the fourth inserting unit 18 and the wavelength multiplexed signal light input from the branching unit 22, and outputs the multiplexed wavelength multiplexed signal light from the route #4.

Figure 3:
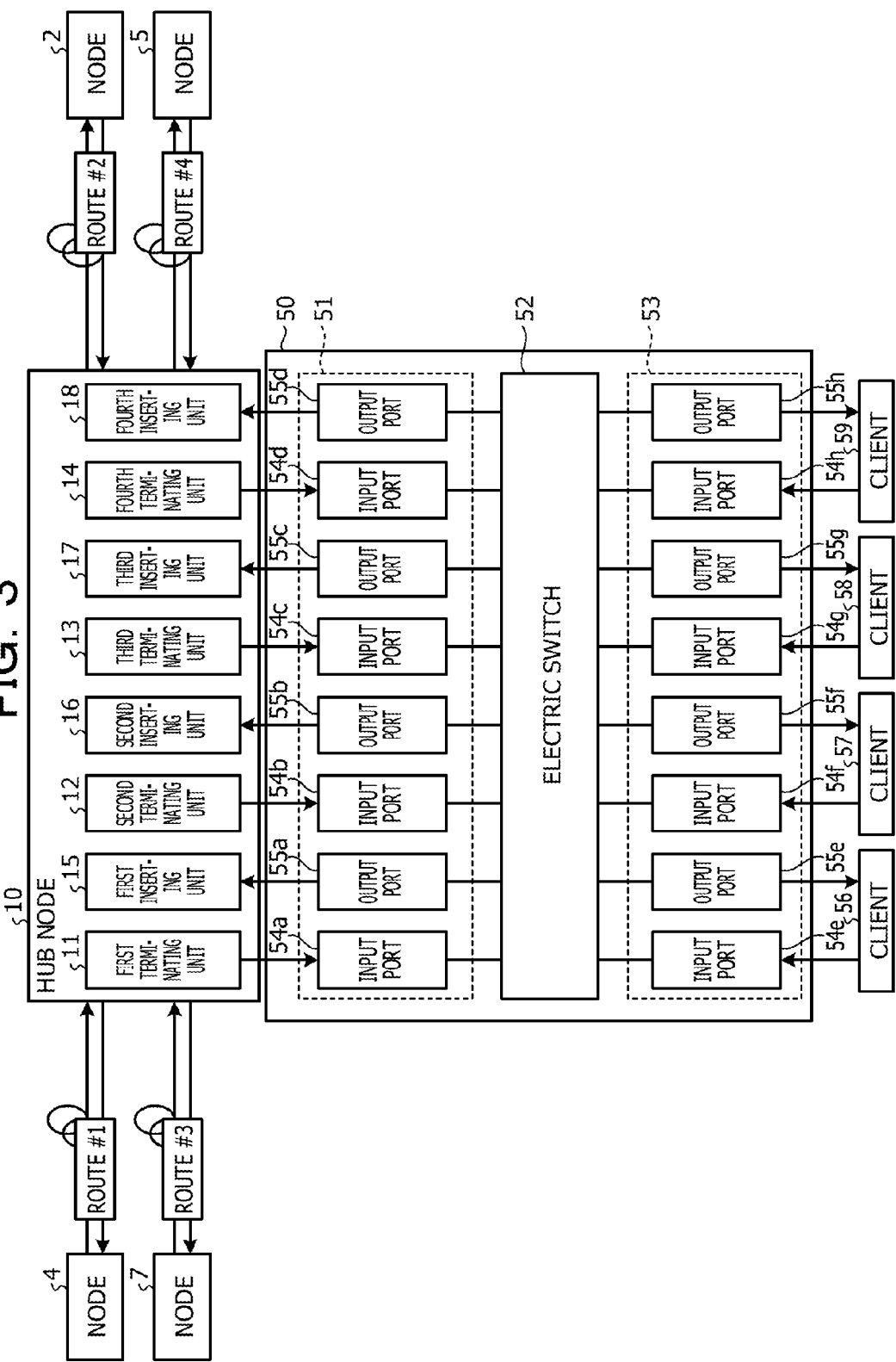
FIG. 3 is a block diagram of assistance in explaining an example of a functional configuration of a switch unit.

An example of a switch unit will next be described with reference to FIG. 3. FIG. 3 is a block diagram of assistance in explaining an example of a functional configuration of a switch unit. The switch unit illustrated in FIG. 3 may be the switch unit 50 illustrated in FIG. 1. The switch unit 50 includes a line side interface 51, an electric switch 52, and a client side interface 53. The switch unit 50 is coupled to the hub node 10 via the line side interface 51, and is coupled to clients 56 to 59 via the client side interface 53.

The line side interface 51 includes a plurality of input ports 54a to 54d and a plurality of output ports 55a to 55d. The client side interface 53 includes a plurality of input ports 54e to 54h and a plurality of output ports 55e to 55h.

When the input ports 54a to 54d receive the electric signals converted from signal light by the terminating units 11 to 14 of the hub node 10, the input ports 54a to 54d output the received electric signals to the electric switch 52. In addition, when the input ports 54e to 54h receive, from the clients 56 to 59 coupled to the input ports 54e to 54h, electric signals of data to be transmitted from the hub node 10 to the other nodes 2 to 7, the input ports 54e to 54h output the received electric signals to the electric switch 52.

When the output ports 55a to 55d receive electric signals from the electric switch 52, the output ports 55a to 55d output the received electric signals to the inserting units 15 to 18 of the hub node 10. In addition, when the output ports 55e to 55h receive electric signals from the electric switch 52, the output ports 55e to 55h output the received electric signals to the clients 56 to 59 coupled to the output ports 55e to 55h.

The electric switch 52 is an electric switch that couples the respective input ports 54a to 54h and the respective output ports 55a to 55h. The electric switch 52 is for example realized by a crossbar switch or the like. Such an electric switch 52 transmits electric signals input from the respective input ports 54a to 54h to the respective output ports 55a to 55h on the basis of the transmission destinations of the electric signals.

For example, when the client 56 inputs, to the input port 54e, the electric signal of data to be output to the route #3, the electric switch 52 transmits the input electric signal to the output port 55c coupled to the third inserting unit 17. In addition, when the hub node 10 receives the signal light of data having the client 58 as a transmission destination from the route #2, the electric signal of the data is input to the electric switch 52 from the second terminating unit 12 via the input port 54b. In such a case, the electric switch 52 transmits the electric signal of the input data to the output port 55g, which outputs the electric signal of the input data to the client 58.

In addition, when a fault has occurred in the route #2, the electric switch 52 transmits, to the output port 55c, the electric signal input from the first terminating unit 11 to the input port 54a, to make the third inserting unit 17 output the electric signal. Consequently, the switch unit 50 may output the data of the wavelength multiplexed signal light received from the route #1 to the route #3 when a fault has occurred in the route #2.

Incidentally, the electric switch 52 may autonomously perform the above-described processing of the electric switch 52 by analyzing the header of data to be transmitted and received or the like, or the electric switch 52 may perform the above-described processing of the electric switch 52 according to an instruction from a control device.

Figure 4:
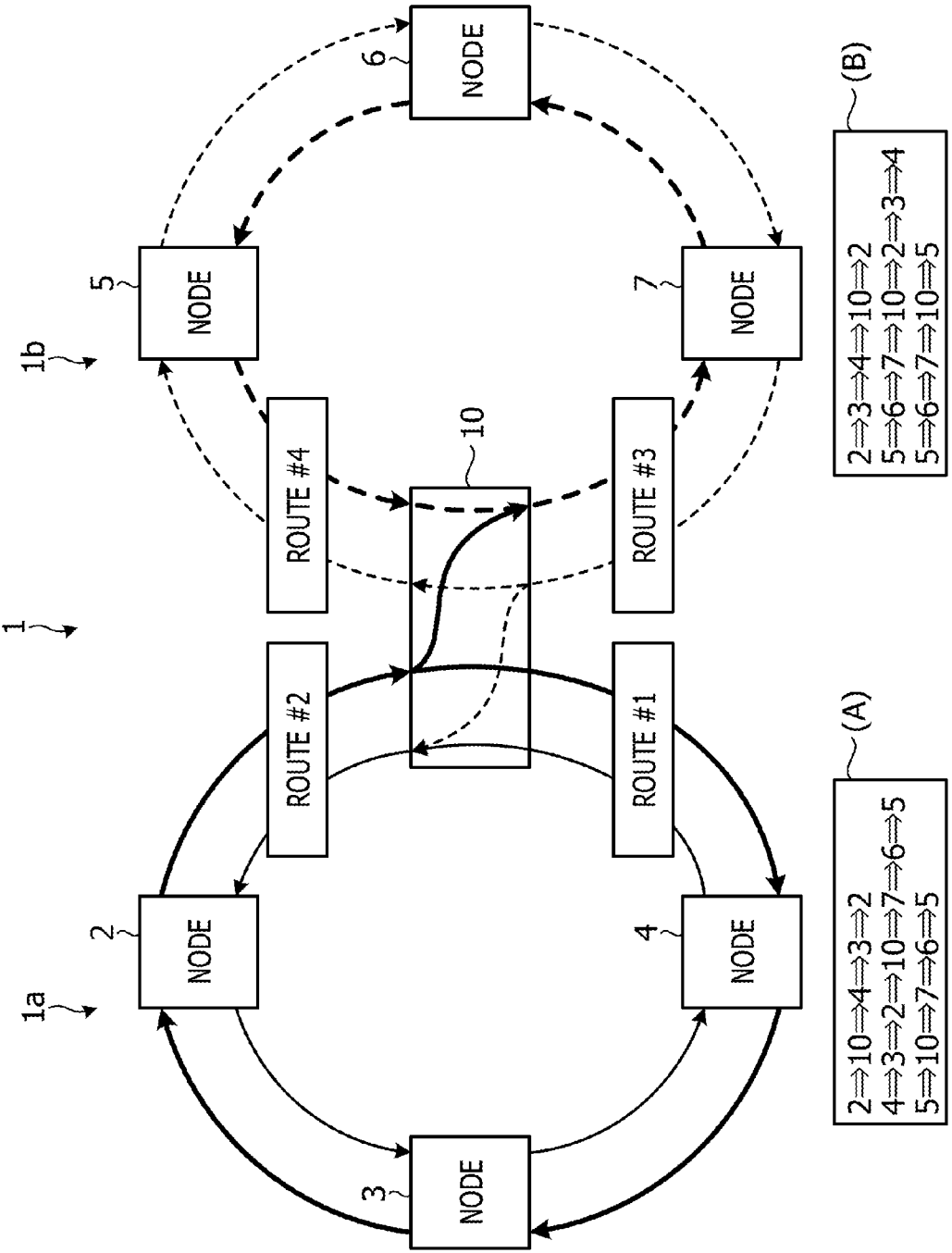
FIG. 4 is a diagram of assistance in explaining an example of processing in which a hub node relays communication.

Description will next be made of an example of processing in which a hub node relays communication between two ring networks. FIG. 4 is a diagram of assistance in explaining an example of processing in which a hub node relays communication. The hub node and the two ring networks illustrated in FIG. 4 may be the hub node 10 and the ring networks 1a and 1b illustrated in FIG. 1. As illustrated in FIG. 4, the hub node 10 limits optical communication between the ring networks 1a and 1b to a path via the route #2 and the route #3. On the other hand, as indicated by a thin solid line and a thick solid line in FIG. 4, the nodes 2 to 4 are coupled to each other by the ring network 1a in the form of a circular ring which ring network allows communication to be performed bidirectionally. As indicated by a thin dotted line and a thick dotted line in FIG. 4, the nodes 5 to 7 are coupled to each other by the ring network 1b in the form of a circular ring which ring network allows communication to be performed bidirectionally.

For example, as indicated by (A) in FIG. 4, the nodes 2 to 4 and the hub node 10 may communicate via a path represented by the thick solid line in FIG. 4 in order of the node 2, the hub node 10, the node 4, the node 3, and the node 2. In addition, the nodes 2 to 7 and the hub node 10 may communicate via a path represented by the thick solid line and the thick dotted line in FIG. 4 in order of the node 4, the node 3, the node 2, the hub node 10, the node 7, the node 6, and the node 5. In addition, the nodes 5 to 7 and the hub node 10 may communicate via a path represented by the thick dotted line in FIG. 4 in order of the node 5, the hub node 10, the node 7, the node 6, and the node 5.

In addition, for example, as indicated by (B) in FIG. 4, the nodes 2 to 4 and the hub node 10 may communicate via a path represented by the thin solid line in FIG. 4 in order of the node 2, the node 3, the node 4, the hub node 10, and the node 2. In addition, the nodes 2 to 7 and the hub node 10 may communicate via a path represented by the thin dotted line and the thin solid line in FIG. 4 in order of the node 5, the node 6, the node 7, the hub node 10, the node 2, the node 3, and the node 4. In addition, the nodes 5 to 7 and the hub node 10 may communicate via a path represented by the thin dotted line in FIG. 4 in order of the node 5, the node 6, the node 7, the hub node 10, and the node 5.

As described above, the nodes 2 to 7 and the hub node 10 may communicate via the paths illustrated in FIG. 4. Therefore, even when the hub node 10 limits optical communication between the ring networks 1a and 1b to the path via the route #2 and the route #3, two-way communication may be realized between arbitrary nodes of the nodes 2 to 7 and the hub node 10.

Figure 5:
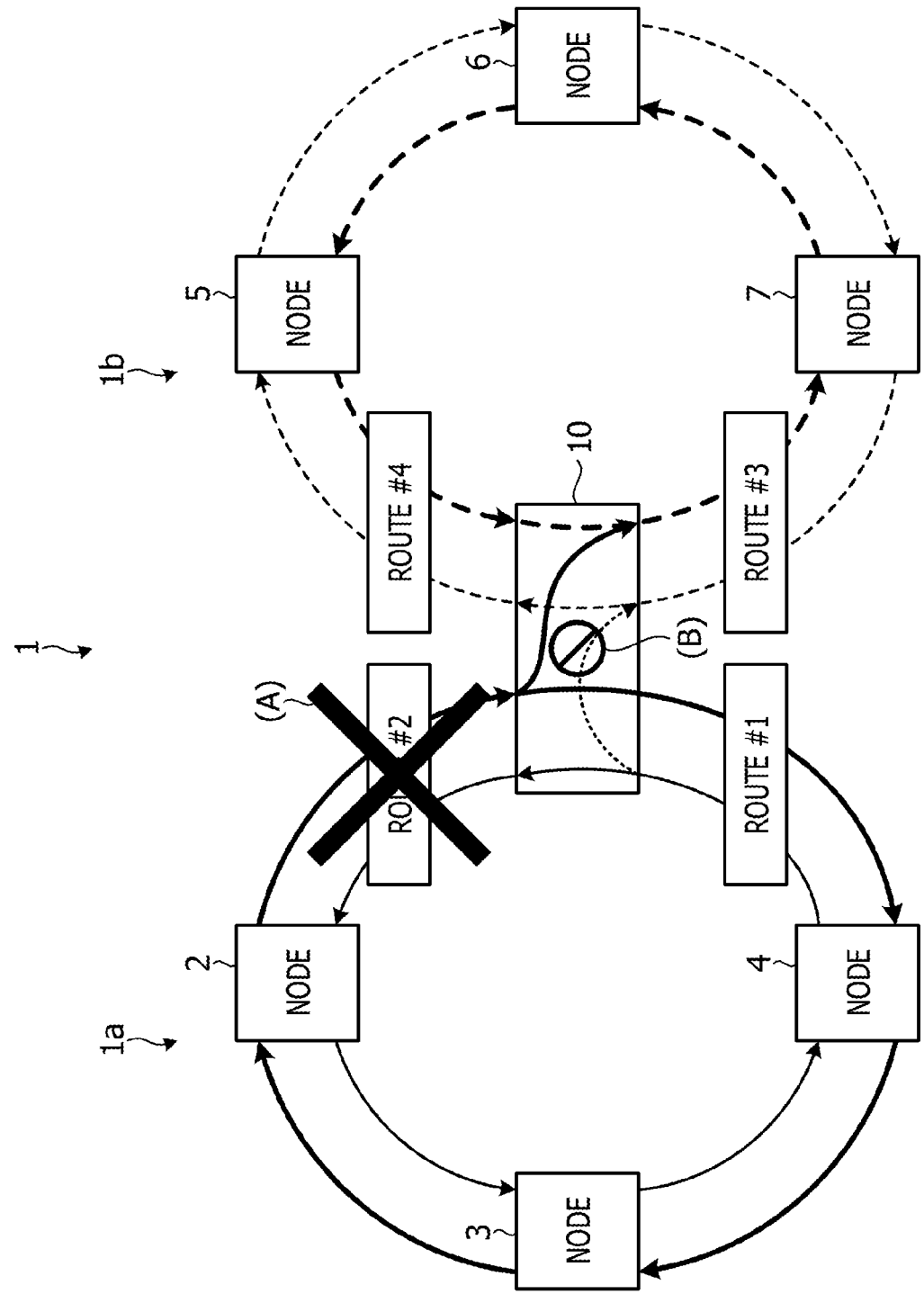
FIG. 5 is a diagram of assistance in explaining an example of a fault that occurs in a transmission network.

FIG. 5 is a diagram of assistance in explaining an example of a fault that occurs in a transmission network. For example, as indicated by (A) in FIG. 5, when a fault has occurred in the route #2 and it is thus difficult for the hub node 10 and the node 2 to communicate with each other, it is difficult for each of the nodes 2 to 7 to perform optical communication spanning the ring networks 1a and 1b. For example, as indicated by (B) in FIG. 5, the hub node 10 does not relay wavelength multiplexed signal light from the route #1 to the route #3 nor to the route #4. Thus, for example, it is difficult to transmit signal light from the node 4 to the node 7.

Accordingly, when a fault has occurred in the route #2, the hub node 10 converts wavelength multiplexed signal light received from the route #1 into an electric signal, and outputs the electric signal to the switch unit 50. In that case, the switch unit 50 transmits the received electric signal to the port to which the electric signal of data to be transmitted to the route #3 is input, that is, the third inserting unit 17. As a result, the hub node 10 converts the electric signal input from the third inserting unit 17 into signal light, and outputs the signal light to the route #3. The data received from the route #1 may therefore be output to the route #3.

Figure 6:
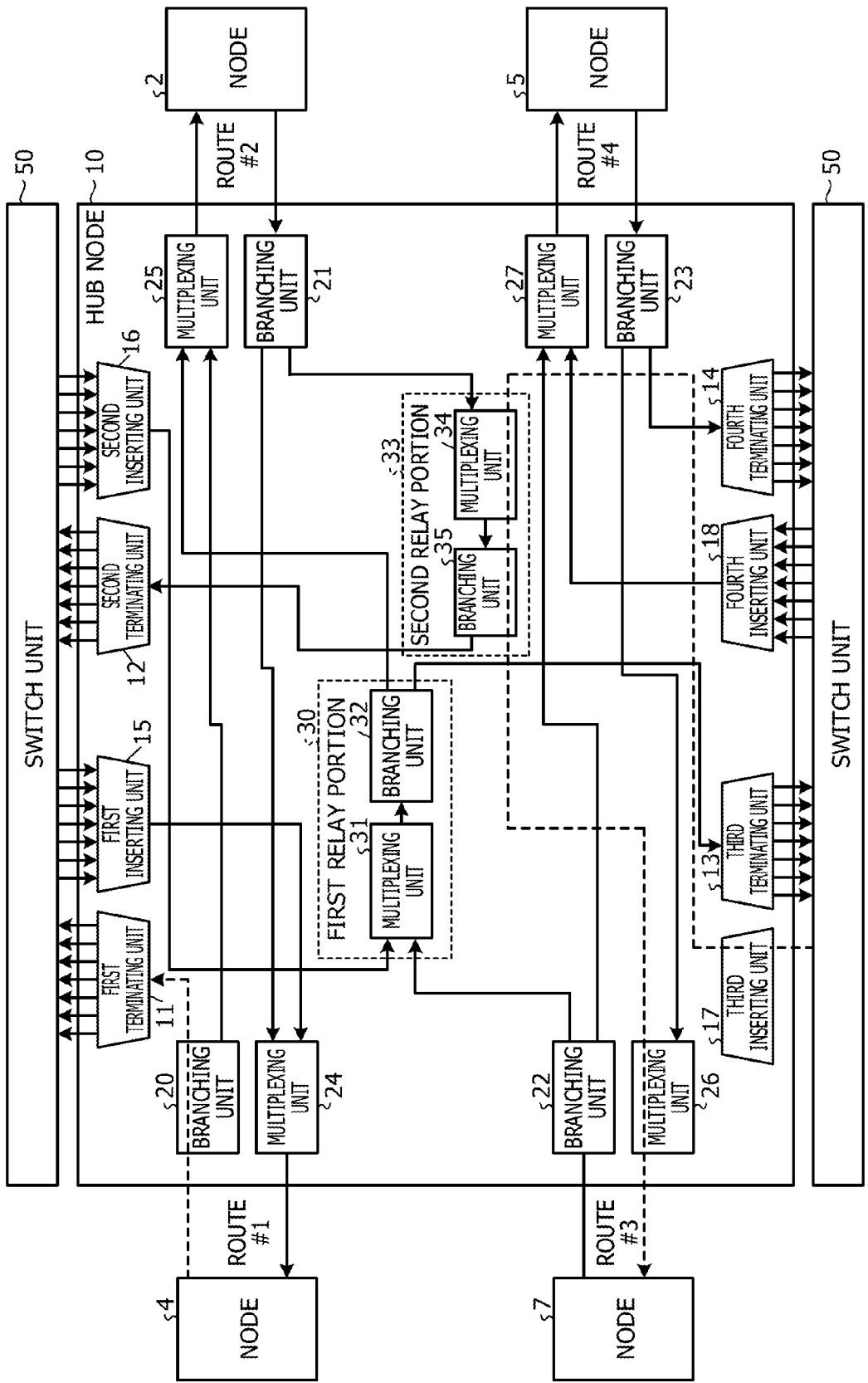
FIG. 6 is a block diagram of assistance in explaining an example of processing performed by a hub node.

FIG. 6 is a block diagram of assistance in explaining an example of processing performed by a hub node. For example, when a fault has occurred in the route #2, the branching unit 20 branches wavelength multiplexed signal light received from the route #1, and outputs one of the branched pieces of wavelength multiplexed signal light to the first terminating unit 11. In that case, the first terminating unit 11 terminates the received wavelength multiplexed signal light, converts the wavelength multiplexed signal light into an electric signal, and outputs the electric signal to the switch unit 50.

On the other hand, the switch unit 50 transmits the received electric signal to the third inserting unit 17. In that case, the third inserting unit 17 converts the received electric signal into wavelength multiplexed signal light, and outputs the wavelength multiplexed signal light after the conversion to the multiplexing unit 26 via the second relay portion 33. As a result, the hub node 10 may output the wavelength multiplexed signal light received from the route #1 to the route #3.

Figure 7:
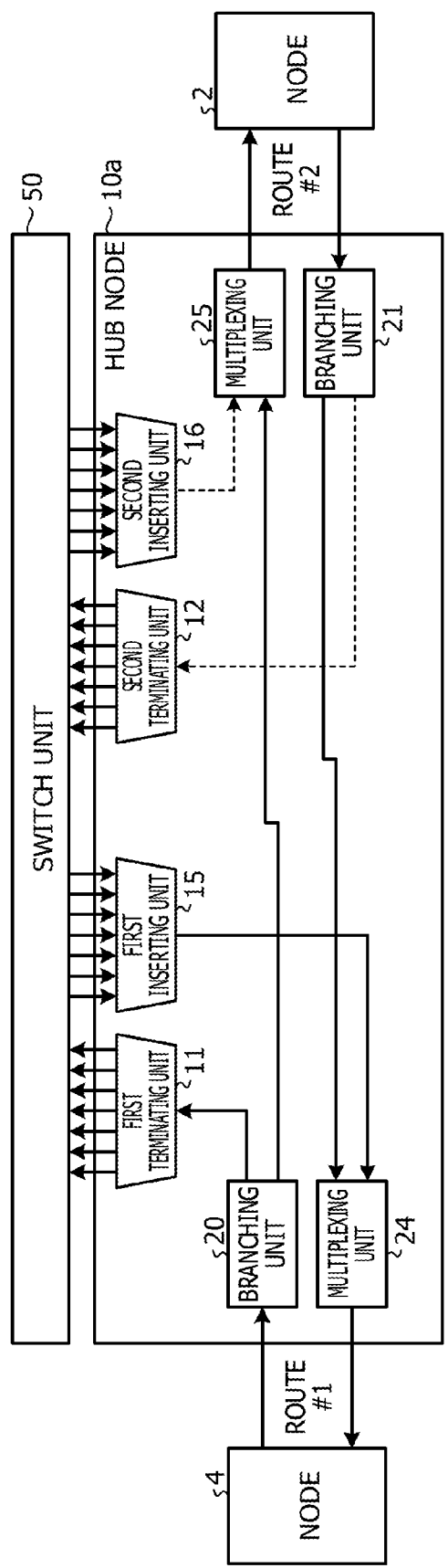
FIG. 7 is a diagram of assistance in explaining an example of a functional configuration of a hub node before an expansion.
Figure 8:
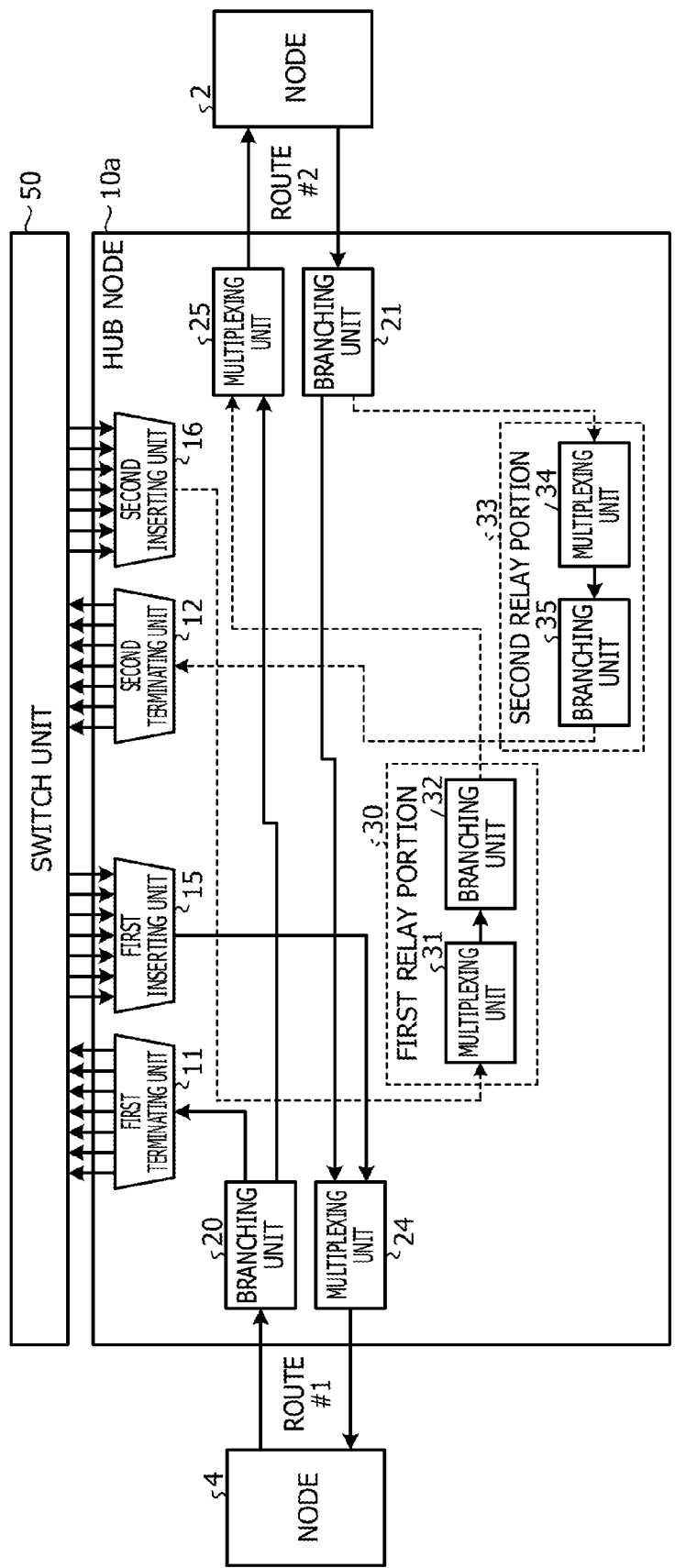
FIG. 8 is a diagram of assistance in explaining an example of an expansion preparation.
Figure 9:
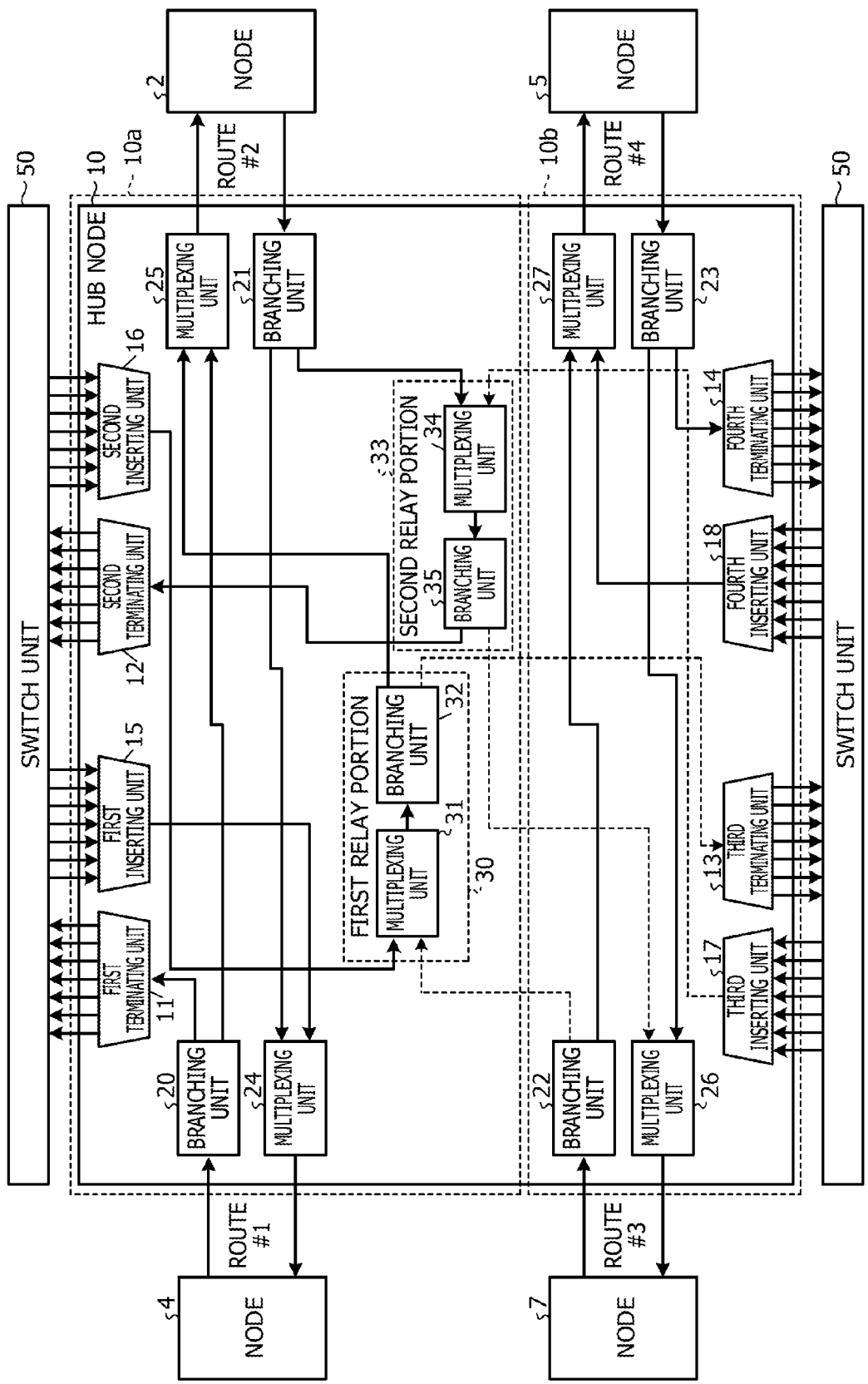
FIG. 9 is a diagram of assistance in explaining an example of processing of expanding an optical transmission network.

Next, referring to FIGS. 7 to 9, description will be made of an example of processing of expanding an optical transmission network by coupling two ring networks to each other. FIG. 7 is a diagram of assistance in explaining an example of a functional configuration of a hub node before an expansion. FIG. 8 is a diagram of assistance in explaining an example of an expansion preparation. FIG. 9 is a diagram of assistance in explaining an example of processing of expanding an optical transmission network. The two ring networks and the optical transmission network explained in FIGS. 7 to 9 may be the ring networks 1a and 1b and the optical transmission network 1 illustrated in FIG. 1. Incidentally, the following description will be made of an example of processing in which hub nodes 10a and 10b that exert functions similar to the functions of the node 2 are installed in the ring networks 1a and 1b and the hub nodes 10a and 10b are coupled to each other to be made to operate as the hub node 10 illustrated in FIG. 1.

For example, the hub node 10a installed in the ring network 1a has a functional configuration illustrated in FIG. 7. For example, the hub node 10a includes a first terminating unit 11, a second terminating unit 12, a first inserting unit 15, a second inserting unit 16, branching units 20 and 21, and multiplexing units 24 and 25.

The branching unit 20 branches and outputs wavelength multiplexed signal light received from the route #1 to the first terminating unit 11 and the multiplexing unit 25. In addition, the branching unit 21 branches and outputs wavelength multiplexed signal light received from the route #2 to the second terminating unit 12 and the multiplexing unit 24. On the other hand, the multiplexing unit 24 multiplexes the wavelength multiplexed signal light received from the branching unit 21 and signal light received from the first inserting unit 15, and outputs the multiplexed wavelength multiplexed signal light to the route #1. In addition, the multiplexing unit 25 multiplexes the wavelength multiplexed signal light received from the branching unit 20 and signal light received from the second inserting unit 16, and outputs the multiplexed wavelength multiplexed signal light to the route #2.

When the ring network 1a and the ring network 1b are coupled to each other, a first relay portion 30 and a second relay portion 33 are added to the hub node 10a installed in the ring network 1a, as illustrated in FIG. 8. For example, as indicated by dotted lines in FIG. 8, signal light output by the second inserting unit 16 is input to a multiplexing unit 31 of the first relay portion 30, and wavelength multiplexed signal light output by a branching unit 32 of the first relay portion 30 is input to the multiplexing unit 25. In addition, wavelength multiplexed signal light output by the branching unit 21 is input to a multiplexing unit 34 of the second relay portion 33, and wavelength multiplexed signal light output by a branching unit 35 is input to the second terminating unit 12.

On the other hand, the hub node 10b of the ring network 1b has a functional configuration similar to the functional configuration of the hub node 10a illustrated in FIG. 7. As in the hub node 10a, the coupling of the first relay portion 30 and the second relay portion 33 is added to the hub node 10b. For example, as illustrated in FIG. 9, the hub node 10b includes a third terminating unit 13, a fourth terminating unit 14, a third inserting unit 17, a fourth inserting unit 18, branching units 22 and 23, and multiplexing units 26 and 27.

The third inserting unit 17 inputs signal light to the multiplexing unit 34 of the second relay portion 33. The branching unit 35 of the second relay portion 33 inputs wavelength multiplexed signal light to the multiplexing unit 26. In addition, the branching unit 22 inputs branched wavelength multiplexed signal light to the multiplexing unit 31 of the first relay portion 30. In addition, the branching unit 32 of the first relay portion 30 inputs branched wavelength multiplexed signal light to the third terminating unit 13. Consequently, the hub node 10a and the hub node 10b operate as the hub node 10 illustrated in FIG. 2.

Here, when the couplings represented by the dotted lines in FIG. 8 are added, wavelength multiplexed signal light flowing through the route #1 and the route #2 is not obstructed. Similarly, when the couplings represented by the dotted lines in FIG. 9 are added, wavelength multiplexed signal light flowing through the route #3 and the route #4 is not obstructed. The hub nodes 10a and 10b therefore allow an expansion of the optical transmission network 1 to be realized while the ring networks 1a and 1b remain in operation.

Figure 10:
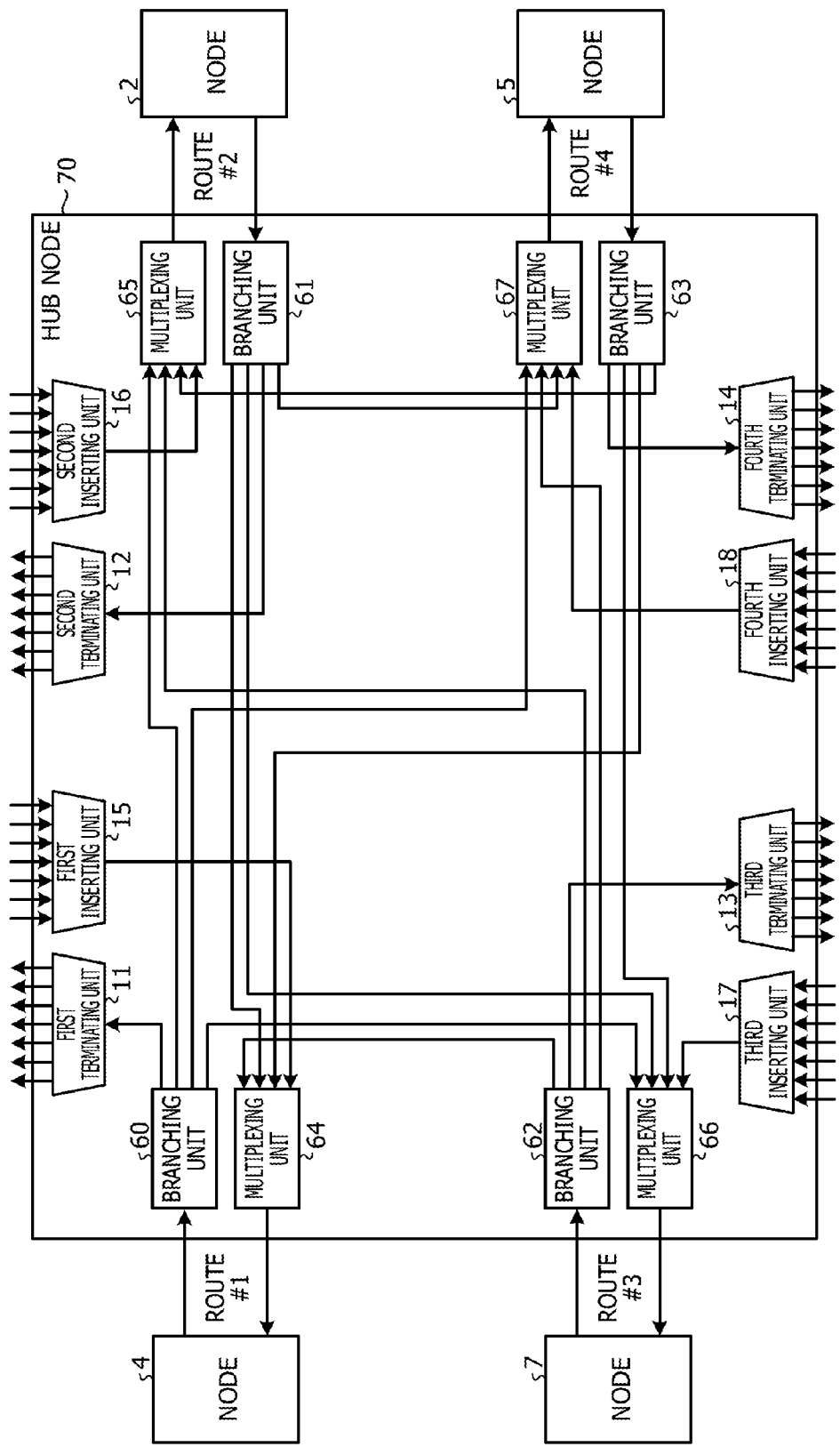
FIG. 10 is a diagram of assistance in explaining an example of a functional configuration of a conventional hub node.

FIG. 10 is a diagram of assistance in explaining an example of a functional configuration of a conventional hub node. A conventional hub node 70 for example includes terminating units 11 to 14, inserting units 15 to 18, branching units 60 to 63, and multiplexing units 64 to 67. The hub node 70 illustrated in FIG. 10 transmits wavelength multiplexed signal light received from each of the routes #1 to #4 to all of the other routes.

For example, the branching unit 60 branches and outputs wavelength multiplexed signal light received from the route #1 to the multiplexing units 65 to 67 that output wavelength multiplexed signal light from the routes #2 to #4 and the first terminating unit 11. In addition, the other branching units 61 to 63 similarly branch and output wavelength multiplexed signal light to the three routes other than the route from which the wavelength multiplexed signal light is received and the output unit that terminates the wavelength multiplexed signal light. Therefore, the branching units 60 to 63 are realized by a 1×4 optical coupler that branches input signal light into four pieces of signal light. In addition, the multiplexing units 64 to 67 of the hub node 70 multiplex three pieces of wavelength multiplexed signal light input from all of routes other than the route from which to output wavelength multiplexed signal light and the signal light of data to be output. Therefore, the multiplexing units 64 to 67 are realized by a 4×1 WSS that multiplexes four pieces of signal light.

As described above, the hub node 70 transmits wavelength multiplexed signal light received from each of the routes #1 to #4 to all of the other routes. Therefore, the hub node 70 needs optical couplers and WSSs having a large number of ports, which increases cost at a time of expanding the optical transmission network 1.

On the other hand, the above-described hub node 10 limits a path at a time of communication spanning the ring networks 1a and 1b to the path via the route #2 and the route #3. For example, as described above, the hub node 10 couples the route #1 and the route #2 to each other, the route #1 and the route #2 being communication paths on the ring network 1a where communication is performed bidirectionally, and couples the route #3 and the route #4 to each other, the route #3 and the route #4 being communication paths on the ring network 1b. In addition, the hub node 10 includes the branching units 20 to 23.

The branching unit 20 branches and outputs signal light received from the route #1 to the first terminating unit 11 and the multiplexing unit 25 that outputs signal light to the route #2. In addition, the branching unit 21 branches and outputs signal light received from the route #2 to the second terminating unit 12, the multiplexing unit 24 that outputs signal light to the route #1, and the multiplexing unit 26 that outputs signal light to the route #3. In addition, the branching unit 22 branches and outputs signal light received from the route #3 to the third terminating unit 13, the multiplexing unit 27 that outputs signal light to the route #4, and the multiplexing unit 25 that outputs signal light to the route #2. In addition, the branching unit 23 branches and outputs signal light received from the route #4 to the fourth terminating unit 14 and the multiplexing unit 26 that outputs signal light to the route #3.

The hub node 10 may therefore reduce the number of ports of optical couplers and WSSs that may be necessary in coupling the ring network 1b to the ring network 1a. For example, the hub node 10 may couple the ring network 1a and the ring network 1b to each other with a mere addition of two sets of a 1×2 optical coupler and a 2×1 WSS. Consequently, the hub node 10 allows an expansion of the optical transmission network to be realized without an increase in cost.

Incidentally, the hub node 10 allows the optical transmission network to be expanded, by using parts used by the hub node 10a, such for example as 1×2 optical couplers and 2×1 WSSs or the like. It is therefore unnecessary to prepare new parts, so that a start on a small scale may be realized. In addition, the hub node 10 couples the ring networks 1a and 1b to each other. Thus, two-way communication between each of the nodes 2 to 7 may be realized even when the path at a time of communication spanning the ring networks 1a and 1b is limited to the path via the route #2 and the route #3.

In addition, the first terminating unit 11 converts wavelength multiplexed signal light received from the route #1 into an electric signal. The switch unit 50 then transmits the electric signal output by the first terminating unit 11 to the third inserting unit 17. Therefore, even when a fault has occurred in the route #2, for example, the hub node 10 allows two-way communication between each of the nodes 2 to 7 to be continued.

In addition, the hub node 10 includes the multiplexing units 31 and 34 and the branching units 32 and 35. The multiplexing unit 31 multiplexes wavelength multiplexed signal light output to the multiplexing unit 25 by the branching unit 22 and signal light output by the second inserting unit 16. The branching unit 32 branches and outputs the wavelength multiplexed signal light multiplexed by the multiplexing unit 31 to the multiplexing unit 25 and the third terminating unit 13. The multiplexing unit 34 multiplexes wavelength multiplexed signal light output to the multiplexing unit 26 by the branching unit 21 and signal light output by the third inserting unit 17. The branching unit 35 branches and outputs the wavelength multiplexed signal light multiplexed by the multiplexing unit 34 to the multiplexing unit 26 and the second terminating unit 12. The hub node 10 may therefore couple the ring networks 1a and 1b to each other by using the 1×2 optical couplers and the 2×1 WSSs. Thus, cost involved in expanding the optical transmission network 1 may be further reduced.

Incidentally, the above-described hub node 10 couples the two ring networks 1a and 1b to each other. However, embodiments are not limited to this. For example, the hub node 10 may couple an arbitrary number of networks or networks in arbitrary forms to each other. Accordingly, in the following second embodiment, description will be made of a hub node coupling one ring network to a linear network that allows communication to be performed bidirectionally.

Second Embodiment

Figure 11:
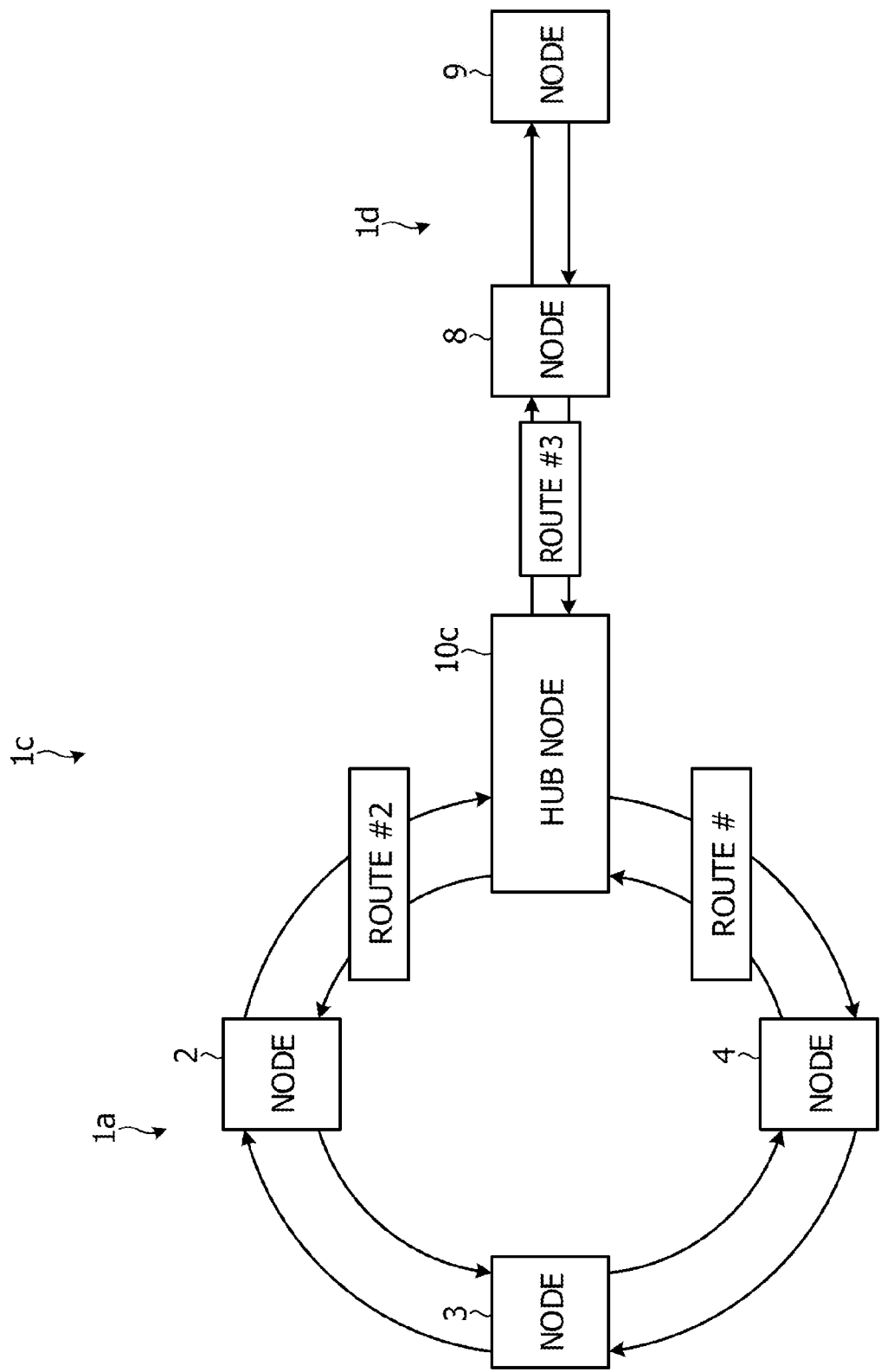
FIG. 11 is a block diagram illustrating an example of an optical transmission network according to a second embodiment.

FIG. 11 is a block diagram illustrating an example of an optical transmission network according to a second embodiment. In the example illustrated in FIG. 11, an optical transmission network 1c has a form in which a hub node 10c couples a ring network 1a and a linear network 1d. The linear network 1d in this case is a network in which the hub node 10c, a node 8, and a node 9 are linearly coupled to each other in a bidirectionally communicable mode.

In the optical transmission network 1c illustrated in FIG. 11, the hub node 10c is coupled to a route #1 and a route #2, which are communication paths of the ring network 1a, and a route #3, which is a communication path of the linear network 1d. In such an optical transmission network 1c, the hub node 10c outputs wavelength multiplexed signal light received from the route #1 to the route #2, outputs wavelength multiplexed signal light received from the route #2 to the route #1 and the route #3, and outputs wavelength multiplexed signal light received from the route #3 to the route #2. That is, the hub node 10c limits a communication path spanning the ring network 1a and the linear network 1d to a path via the route #2 and the route #3.

Even when the communication path spanning the ring network 1a and the linear network 1d is limited to the path via the route #2 and the route #3, the optical transmission network 1c may ensure two-way communication between each of the nodes 2 to 4, 8, and 9. For example, the optical transmission network 1c may transmit wavelength multiplexed signal light in order of the node 9, the node 8, the hub node 10c, the node 2, the node 3, and the node 4.

Figure 12:
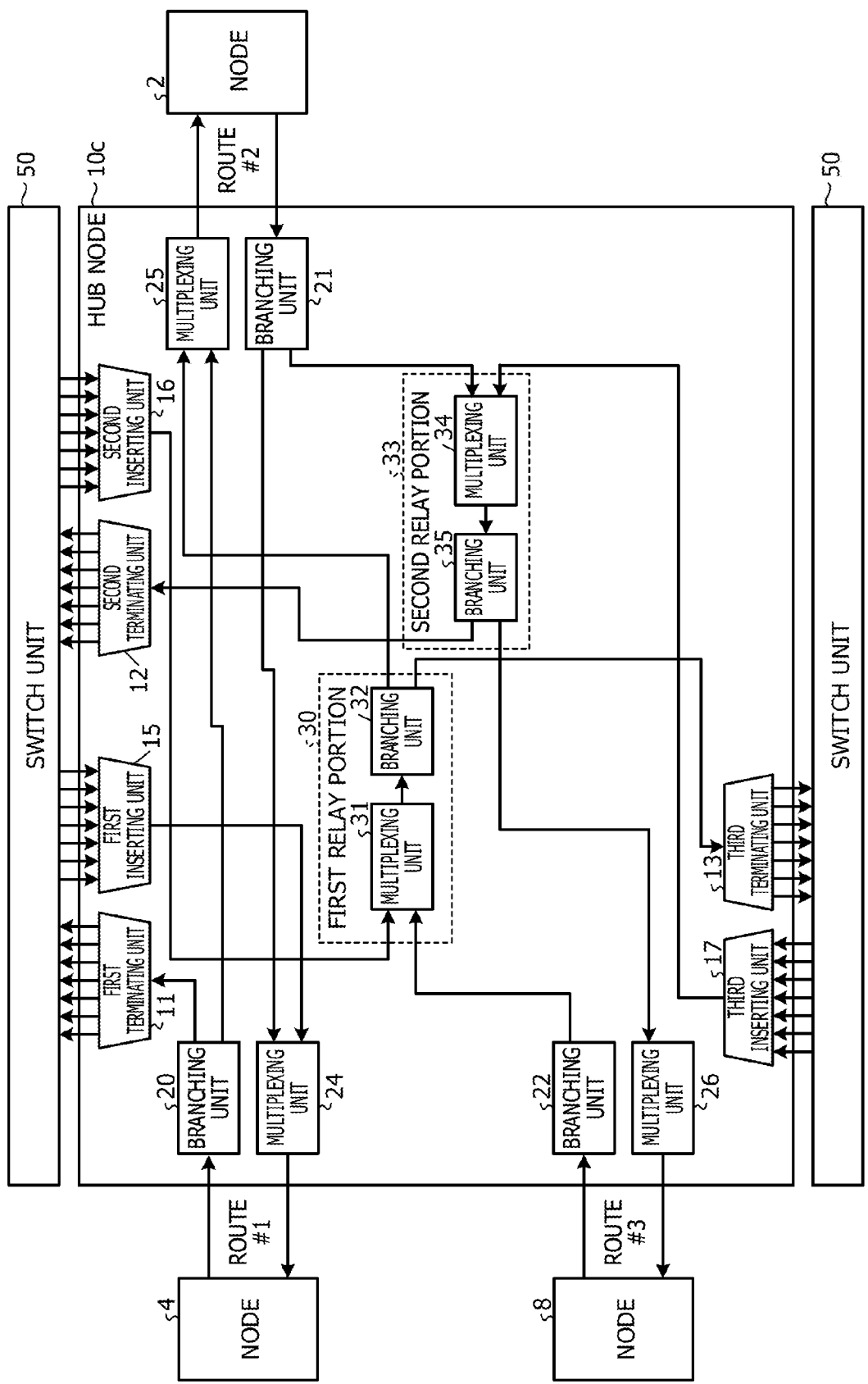
FIG. 12 is a block diagram of assistance in explaining another example of a functional configuration of a hub node.

An example of a functional configuration of a hub node will next be described with reference to FIG. 12. FIG. 12 is a block diagram of assistance in explaining another example of a functional configuration of a hub node. The hub node illustrated in FIG. 12 may be the hub node 10c illustrated in FIG. 11. In the example illustrated in FIG. 12, the hub node 10c includes terminating units 11 to 13, inserting units 15 to 17, branching units 20 to 22, 32, and 35, and multiplexing units 24 to 26, 31, and 34. That is, the hub node 10c has a functional configuration without the branching unit 23, the multiplexing unit 27, the fourth terminating unit 14, and the fourth inserting unit 18 in the functional configuration of the hub node 10 illustrated in FIG. 2.

In such a configuration, the branching unit 22 outputs wavelength multiplexed signal light received from the route #3 to the multiplexing unit 25. On the other hand, the multiplexing unit 31 multiplexes the wavelength multiplexed signal light output to the multiplexing unit 25 by the branching unit 22 with signal light from the second inserting unit 16. Then, the branching unit 32 branches and outputs the wavelength multiplexed signal light multiplexed by the multiplexing unit 31 to the multiplexing unit 25 and the third terminating unit 13. In addition, the multiplexing unit 26 outputs wavelength multiplexed signal light received from the branching unit 35 to the route #3.

As described above, the hub node 10c couples the route #1 and the route #2, which are communication paths on the ring network 1a where communication is performed bidirectionally, and the route #3, which is a communication path on the linear network 1d. In addition, the hub node 10c includes the branching units 20 to 22.

The branching unit 20 branches and outputs signal light received from the route #1 to the first terminating unit 11 and the multiplexing unit 25 that outputs signal light to the route #2. In addition, the branching unit 21 branches and outputs signal light received from the route #2 to the second terminating unit 12, the multiplexing unit 24 that outputs signal light to the route #1, and the multiplexing unit 26 that outputs signal light to the route #3. In addition, the branching unit 22 branches and outputs signal light received from the route #3 to the third terminating unit 13 and the multiplexing unit 25 that outputs signal light to the route #2.

The above-described hub node 10c may couple the ring network 1a and the linear network 1d to each other by optical couplers and WSSs having a small number of ports. For example, the hub node 10c may couple the ring network 1a and the linear network 1d to each other with a mere addition of two sets of a 1×2 optical coupler and a 2×1 WSS. The hub node 10c may therefore reduce cost involved in expanding the optical transmission network 1c.

Incidentally, the above-described hub nodes 10 and 10c include the second relay portion 33 that multiplexes wavelength multiplexed signal light output to the multiplexing unit 26 by the branching unit 21 and signal light output by the third inserting unit 17, and which branches and outputs the multiplexed wavelength multiplexed signal light to the second terminating unit 12 and the multiplexing unit 26. In addition, the above-described hub nodes 10 and 10c include the first relay portion 30 that multiplexes wavelength multiplexed signal light output to the multiplexing unit 25 by the branching unit 22 and signal light output by the second inserting unit 16, and which branches and outputs the multiplexed wavelength multiplexed signal light to the third terminating unit 13 and the multiplexing unit 25. However, embodiments are not limited to this. Accordingly, the following description will be made of a variation of the first relay portion 30 and the second relay portion 33 as a third embodiment.

Third Embodiment

Figure 13:
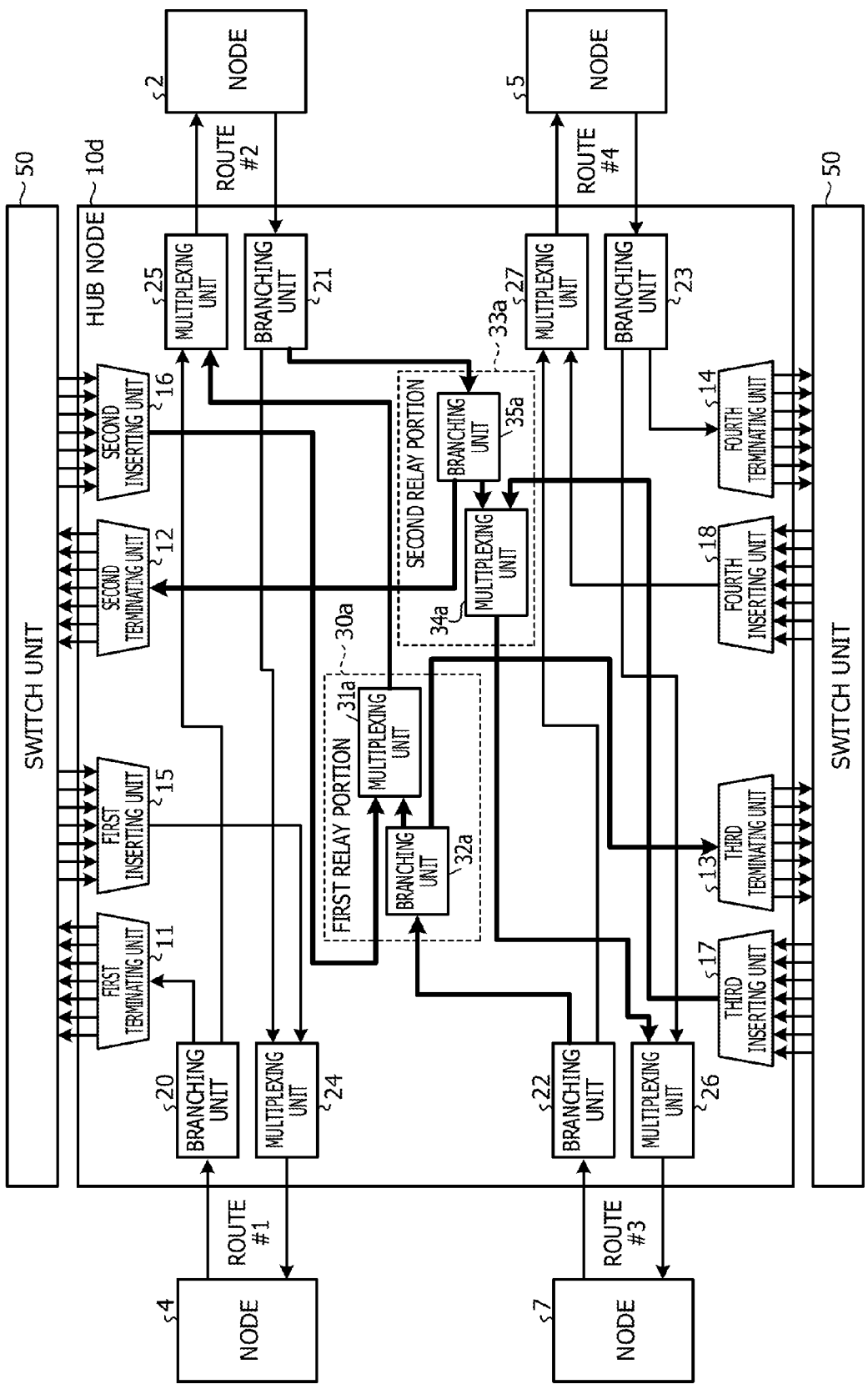
FIG. 13 is a block diagram of assistance in explaining an example of a functional configuration of a hub node according to a third embodiment.

FIG. 13 is a block diagram of assistance in explaining an example of a functional configuration of a hub node according to a third embodiment. As illustrated in FIG. 13, a hub node 10d includes a first relay portion 30a and a second relay portion 33a. The first relay portion 30a includes a multiplexing unit 31a and a branching unit 32a. In addition, the second relay portion 33a includes a multiplexing unit 34a and a branching unit 35a.

The branching unit 32a branches and outputs wavelength multiplexed signal light output by a branching unit 22 to the multiplexing unit 31a and a third terminating unit 13. The multiplexing unit 31a multiplexes the wavelength multiplexed signal light output by the branching unit 32a and signal light output by a second inserting unit 16, and outputs the multiplexed signal light to a multiplexing unit 25. In addition, the branching unit 35a branches and outputs wavelength multiplexed signal light output by a branching unit 21 to the multiplexing unit 34a and a second terminating unit 12. The multiplexing unit 34a multiplexes the wavelength multiplexed signal light output by the branching unit 35a and signal light output by a third inserting unit 17, and outputs the multiplexed signal light to a multiplexing unit 26.

That is, the branching unit 32a branches and outputs the wavelength multiplexed signal light output to the multiplexing unit 25 by the branching unit 22 to the multiplexing unit 25 and the third terminating unit 13. The multiplexing unit 31a multiplexes the wavelength multiplexed signal light output to the multiplexing unit 25 by the branching unit 32a and the signal light output by the second inserting unit 16, and outputs the multiplexed signal light to the multiplexing unit 25. The branching unit 35a branches and outputs the wavelength multiplexed signal light output to the multiplexing unit 26 by the branching unit 21 to the multiplexing unit 26 and the second terminating unit 12. The multiplexing unit 34a multiplexes the wavelength multiplexed signal light output to the multiplexing unit 26 by the branching unit 35a and the signal light output by the third inserting unit 17, and outputs the multiplexed signal light to the multiplexing unit 26.

The hub node 10*d* may therefore reduce a decrease in intensity of the wavelength multiplexed signal light output to a route #2 and a route #3. For example, the intensity of wavelength multiplexed signal light branched by an optical coupler is decreased as compared with the intensity of input wavelength multiplexed signal light. Therefore, because the hub node 10 illustrated in FIG. 2 outputs the wavelength multiplexed signal light branched by the branching unit 32 from the multiplexing unit 25 to the route #2, the hub node 10 decreases the intensity of the wavelength multiplexed signal light output from the route #3 to the route #2.

On the other hand, the hub node 10*d* first branches the wavelength multiplexed signal light received from the route #3 in the branching unit 32*a*, then multiplexes the branched wavelength multiplexed signal light with the signal light of data to be output from the route #2 in the multiplexing unit 31*a*, and thereafter outputs the multiplexed signal light to the multiplexing unit 25. As a result, the intensity of the wavelength multiplexed signal light output to the multiplexing unit 25 is amplified by the multiplexing in the multiplexing unit 31*a*. The hub node 10*d* may therefore reduce a decrease in intensity of the wavelength multiplexed signal light output from the route #3 to the route #2.

Fourth Embodiment

Embodiments of the present technology have been described thus far. However, embodiments may be carried out in various different forms other than the above-described embodiments. Accordingly, another embodiment will be described in the following as a fourth embodiment.

[Branching Unit and Multiplexing Unit]

The above-described hub nodes 10, 10*c*, and 10*d* use 1×2 optical couplers and 2×1 WSSs to branch wavelength multiplexed signal light received from each of the routes #1 to #4, and multiplex and output wavelength multiplexed signal light received from another route. However, embodiments are not limited to this. For example, the hub nodes 10, 10*c*, and 10*d* may combine and use for example 1×3 optical couplers or the like rather than a multistage configuration of 1×2 optical couplers and 2×1 WSSs. By limiting a communication path when coupling a two-way ring network and another network to each other, the hub nodes 10, 10*c*, and 10*d* may reduce cost involved in network expansion while realizing two-way communication between nodes in the respective networks.

[Network Expansion]

In addition, the above-described hub nodes 10, 10*c*, and 10*d* may couple an arbitrary number of networks or networks in arbitrary forms to each other as long as the hub nodes 10, 10*c*, and 10*d* couple a two-way ring network and another network to each other. For example, the hub node 10 may couple three two-way ring networks to each other.

[Functional Configuration]

Among the pieces of processing described above, the whole or a part of the processing described as being performed automatically may also be performed manually, or the whole or a part of the processing described as being performed manually may also be performed automatically by a publicly known method. In addition, the processing procedures, the specific names, and the information including various kinds of data and parameters that are illustrated in the document and the drawings may be changed arbitrarily unless otherwise specified.

In addition, the constituent elements of the respective devices illustrated in the figures are functionally conceptual, and do not necessarily need to be physically configured as illustrated in the figures. That is, specific forms of distribution and integration of the devices are not limited to those illustrated in the figures. That is, the whole or a part of the devices may be configured to be distributed or integrated functionally or physically in arbitrary units according to various kinds of loads, usage conditions, and the like.

In addition, the whole or an arbitrary part of the processing functions performed in the respective devices may be implemented by a central processing unit (CPU) and a program analyzed and executed in the CPU, or may be implemented as hardware based on wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitting device coupled to a first route and a second route as communication paths on a first ring network where communication is performed bidirectionally, and coupled to a third route as a communication path on a second ring network where communication is performed bidirectionally, the transmitting device comprising:

a first branching unit configured to branch and output signal light input from the first route to a first terminating unit that terminates signal light and a second output unit that outputs signal light to the second route;

a second branching unit configured to branch and output signal light input from the second route to a second terminating unit that terminates signal light, a first output unit that outputs signal light to the first route, and a third output unit that outputs signal light to the third route; and a third branching unit configured to branch and output signal light input from the third route to a third terminating unit that terminates signal light and the second output unit, wherein the transmitting device is further coupled to a fourth route as a communication path on the second ring network and the transmitting device further includes a fourth branching unit configured to branch and output signal light input from the fourth route to a fourth terminating unit that terminates signal light and the third output unit, the third branching unit branches and outputs the signal light input from the third route to the third terminating unit, the second output unit, and a fourth output unit that outputs signal light to the fourth route;

a first multiplexing unit configured to multiplex signal light to be newly output to the second route with the signal light output to the second output unit by the third branching unit;

a fifth branching unit configured to branch and output the signal light multiplexed by the first multiplexing unit to the second output unit and the third terminating unit;

a second multiplexing unit configured to multiplex signal light to be newly output to the third route with the signal light output to the third output unit by the second branching unit; and a sixth branching unit configured to branch and output the signal light multiplexed by the second multiplexing unit to the third output unit and the second terminating unit.

2. The transmitting device according to claim 1, wherein the first terminating unit converts the input signal light into an electric signal, and outputs the electric signal, and the transmitting device further includes a transmitting unit configured to transmit the electric signal output by the first terminating unit to an input unit that converts the input electric signal into signal light and inputs the signal light to the third output unit.

3. A transmitting device coupled to a first route and a second route as communication paths on a first ring network where communication is performed bidirectionally, and coupled to a third route as a communication path on a second ring network where communication is performed bidirectionally, the transmitting device comprising:

a first branching unit configured to branch and output signal light input from the first route to a first terminating unit that terminates signal light and a second output unit that outputs signal light to the second route;

a second branching unit configured to branch and output signal light input from the second route to a second terminating unit that terminates signal light, a first output unit that outputs signal light to the first route, and a third output unit that outputs signal light to the third route; and a third branching unit configured to branch and output signal light input from the third route to a third terminating unit that terminates signal light and the second output unit, wherein the transmitting device is further coupled to a fourth route as a communication path on the second ring network, the transmitting device further includes a fourth branching unit configured to branch and output signal light input from the fourth route to a fourth terminating unit that terminates signal light and the third output unit, and the third branching unit branches and outputs the signal light input from the third route to the third terminating unit, the second output unit, and a fourth output unit that outputs signal light to the fourth route;

a fifth branching unit configured to branch and output the signal light output to the second output unit by the third branching unit to the third terminating unit and the second output unit;

a first multiplexing unit configured to multiplex signal light to be newly output to the second route with the signal light output to the second output unit by the fifth branching unit;

a sixth branching unit configured to branch and output the signal light output to the third output unit by the second branching unit to the second terminating unit and the third output unit; and a second multiplexing unit configured to multiplex signal light to be newly output to the third route with the signal light output to the third output unit by the sixth branching unit.

4. The transmitting device according to claim 3, wherein the first terminating unit converts the input signal light into an electric signal, and outputs the electric signal, and the transmitting device further includes a transmitting unit configured to transmit the electric signal output by the first terminating unit to an input unit that converts the input electric signal into signal light and inputs the signal light to the third output unit.

5. A transmission control method performed by a transmitting device coupled to a first route and a second route as communication paths on a ring network where communication is performed bidirectionally, and coupled to a third route as a communication path on a network different from the ring network, the transmission control method comprising:

branching and outputting signal light input from the first route to a first terminating unit that terminates signal light and a second output unit that outputs signal light to the second route;

branching and outputting signal light input from the second route to a second terminating unit that terminates signal light, a first output unit that outputs signal light to the first route, and a third output unit that outputs signal light to the third route; and branching and outputting signal light input from the third route to a third terminating unit that terminates signal light and the second output unit, wherein the transmitting device is further coupled to a fourth route as a communication path on the second drip network and the transmitting control method further includes branching and outputting signal light input from the fourth route to a fourth terminating unit that terminates signal light and the third output unit, branching and outputting the signal light input from the third route to the third terminating unit, the second output unit, and a fourth output unit that outputs signal light to the fourth route;

first multiplexing signal light to be newly output to the second route with the signal light output to the second output unit;

branching and outputting the signal light multiplexed by the first multiplexing to the second output unit and the third terminating unit;

second multiplexing signal light to be newly output to the third route with the signal light output to the third output unit by the branching and outputting signal light input from the third route to a third terminating unit that terminates signal light and the second output unit; and branching and outputting the signal light multiplexed by the second multiplexing to the third output unit and the second terminating unit.

* * * * *